Fig. 1.

June 10, 1947.  B. COOPER  2,421,994
ELECTRIC VALVE SYSTEM
Filed March 23, 1943  2 Sheets-Sheet 2

Fig. 2.

Inventor:
Benjamin Cooper,
by Harry E. Dunham
His Attorney.

Patented June 10, 1947

2,421,994

UNITED STATES PATENT OFFICE 2,421,994

ELECTRIC VALVE SYSTEM

Benjamin Cooper, Scotia, N. Y., assignor to General Electric Company, a corporation of New York Application March 23, 1943, Serial No. 480,150

30 Claims. (Cl. 250—27)

My invention relates to electric valve translating systems and more particularly to control or regulating circuits for electric valve apparatus. This application is a continuation in part of my application Serial No. 423,526, filed December 18, 1941, assigned to the assignee of the present invention, and now Patent No. 2,373,543 granted April 10, 1945.

Due to the precision of operation afforded by electric valve apparatus, such as electric valve means which employ ionizable mediums and which include control members for initiating conduction thereby, apparatus of this type has been applied rather generally to those systems where it is important to obtain precise and accurate control of an electrical condition of a load circuit. Furthermore, due to the facility of control provided by apparatus of this nature, electric valve means have been applied to those arrangements where it is important to effect periodic or intermittent energization of the associated load circuit. In accordance with the teachings of my invention described hereinafter, I provide new and improved control or regulating circuits for electric valve translating apparatus whereby the electric valve means is controlled more accurately than that obtainable by the prior art arrangements, and wherein the characteristics of the electric valve apparatus may be employed to greater advantage.

It is an object of my invention to provide new and improved electric valve translating apparatus.

It is another object of my invention to provide new and improved control circuits for electric valve translating apparatus.

It is a further object of my invention to provide new and improved control or regulating circuits.

It is a still further object of my invention to provide new and improved control or regulating circuits for electric valve translating apparatus which effect energization of a load circuit periodically or intermittently.

Briefly stated, in the illustrated embodiments my invention is shown as applied to electric valve translating systems, such as welding systems, where the welding circuit or the load circuit is periodically or intermittently energized, and wherein the regulating or control circuits respond substantially instantaneously to maintain the desired electrical condition of the load circuit at a precise value by pre-setting or pre-conditioning the system.

For a better understanding of my invention, reference may be had to the following description taken in connection with the accompanying drawing, and its scope will be pointed out in the appended claims.

Figure 1:
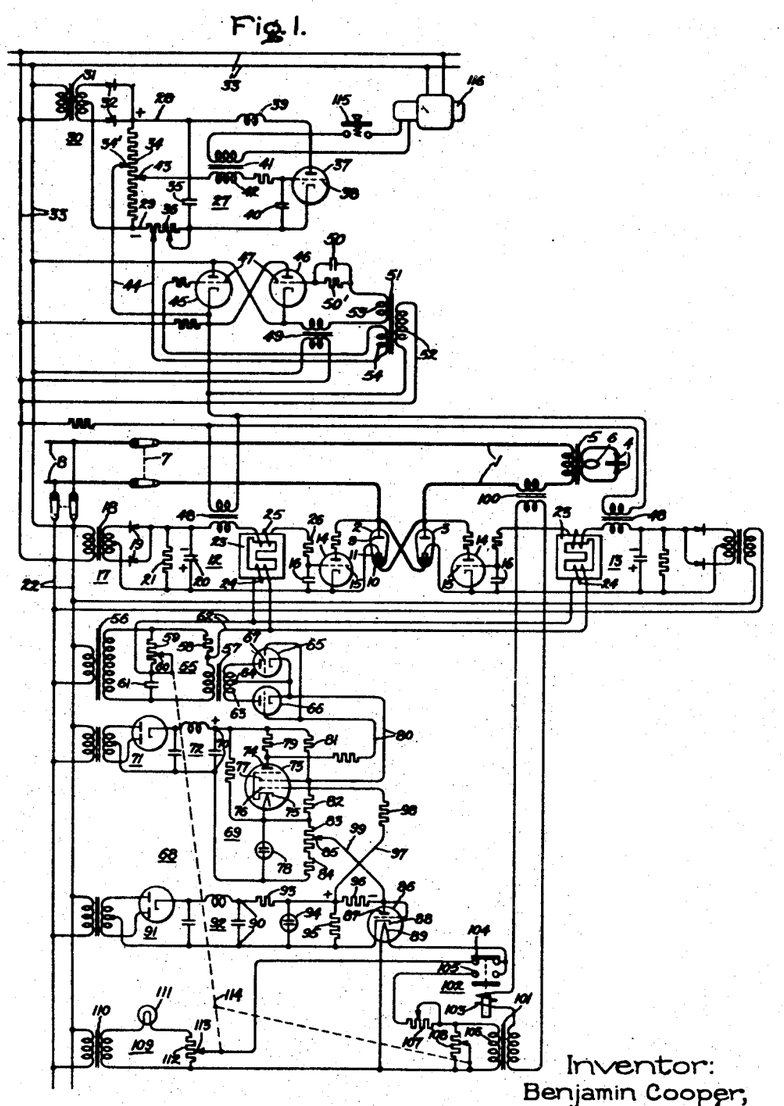
Fig. 1 of the drawing diagrammatically illustrates an embodiment of my invention as applied to a translating system for energizing a load circuit, such as a welding circuit.

Referring now to Fig. 1 of the drawing, my invention is illustrated there as applied to an electric translating system, such as an electric valve translating system, wherein a load circuit 1 is energized by means of electric translating apparatus which may comprise a pair of reversely connected electric valve means 2 and 3. The load circuit 1 may be a welding circuit which is connected to the welding electrodes 4 through a transformer 5 having a secondary winding 6 connected to the welding electrodes. A suitable circuit controlling means, such as a switch 7, may be interposed between the load circuit 1 and a suitable source of current, such as an alternating current supply circuit 8.

Electric valve means 2 and 3 may be of the type comprising an ionizable medium, such as a gas or a vapor, and each may include an anode 9, a cathode such as a mercury pool cathode 10, and a control member such as an immersion-ignitor type control member 11 having an extremity thereof extending into the pool of the associated cathode.

I employ excitation circuits 12 and 13 which control the conductivities of the electric valve means 2 and 3, that is control the time during the respective positive half cycles of anode-cathode voltage at which the electric valve means conduct current. The excitation circuits 12 and 13 are of similar construction and arrangement, and each comprises a control electric valve 14 which transmits energizing impulses of current to the control member 11 of the associated main or power electric valve means 2 or 3. If desired, the control electric valves 14 may be connected between the anodes and the control members 11 of the associated main electric valves. Control electric valves 14 comprise control members or grids 15, the potentials of which control the conductivities thereof and, hence, control the time of energization of the control members 11. Transient absorbing means, such as capacitances 16, may be connected between the grids 15 and the cathodes of the control electric valves 14.

Each of the excitation circuits 12 and 13 also comprises means for impressing on the grids 15 of the electric valves 14 biasing potentials, such as negative unidirectional biasing potentials, tending to maintain the electric valves nonconducting. The biasing potential in each excitation circuit may be provided by means of a rectifier 17 which may be of the bi-phase type comprising a transformer 18 and a pair of unidirectional conducting paths or rectifiers 19 which establish across capacitance 20 and resistance 21 a negative unidirectional potential of the polarity indicated. Transformer 18 may be energized from alternating current supply circuit 8 through circuit 22 which, in turn, is connected to circuit 8 through a switch.

As a means for rendering the electric valves 14 conducting in cooperation with alternating voltages which are described hereinafter, I provide in each of the excitation circuits 12 and 13 means for producing a control voltage, such as a periodic control voltage of peaked wave form. This means may comprise a saturable inductive device, such as a peaking transformer 23 provided with a primary winding 24 and a secondary winding 25 which is connected to grid 15 through a current limiting resistance 26. The magnitude of the voltage of peaked wave form is such that the peaked wave form is insufficient in itself to overcome the effect of the negative unidirectional biasing potential produced by capacitance 20.

Where it is desired to effect energization of the load circuit 1 for a predetermined time, I may employ timing means 27. The timing means 27 produces a timing voltage which determines the period of conduction of electric valve means 2 and 3, and hence determines the energization of load circuit 1. In some applications it is also desirable not only to effect energization of the load circuit for a predetermined interval of time, but it is also desirable to effect periodic or intermittent energization of the load circuit during recurring intervals of time. In order to meet these requirements, I provide in the timing means 27 a circuit which generates a periodic timing voltage. Timing means 27 may comprise a source of direct current comprising a positive conductor 28 and a negative conductor 29. The source of direct current may be provided by means of a rectifier 30 comprising a transformer 31 and a pair of unidirectional conducting paths such as rectifiers 32 which are energized from the supply circuit 8 through circuit 33. A suitable voltage divider comprising a resistance 34 is connected across a source of direct current, and a capacitance 35 is connected to be charged from the source through an adjustable resistance 36. Periodic discharge of capacitance 35 is obtained by means of an electric valve 37 which is of the controlled type having a grid 38. If desired, the electric valve 37 may be of the type employing an ionizable medium such as a gas or a vapor, in which case I may employ in the anode-cathode circuit of the electric valve 37 an inductance 39 which serves to render the electric valve 37 nonconducting near the end of the discharge period of capacitance 35. A transient-absorbing capacitance 40 is connected between the grid 38 and the cathode of the electric valve 37. Synchronization of the generation of each impulse of periodic voltage produced by circuit 37 with respect to the voltage of supply circuit 8 is obtained by means of a transformer 41 which produces a periodic voltage of peaked wave form. Secondary winding 42 of transformer 41 is connected between grid 38 of electric valve 37 and an adjustable contact 43 of the voltage divider comprising resistance 34. The periodic voltage produced by the timing means 27 appears across circuit 44.

I may employ a pair of reversely connected coupling electric valves 45 and 46, each including a control grid 47, and which are controlled by the timing circuit 27 and which serve to introduce into excitation circuits 12 and 13 a predetermined number or trains of half cycles of alternating voltage through transformers 48. The anode-cathode circuits of the electric valves 45 and 46 are energized from circuit 33, and when in a conducting condition supply alternating current to transformers 48. These electric valves may be arranged in a leading and trailing relationship; that is, the electric valve 46 is arranged to conduct current during each half cycle of the voltage of circuit 33 following each half cycle of conduction of electric valve 45. That is, the electric valve 45 is the leading electric valve and electric valve 46 is the trailing valve.

Electric valve 46 is normally maintained nonconducting by means of a biasing potential impressed on its grid 47 by means of the transformer 49 which is energized from circuit 33. Transformer 49 is poled so that the alternating component of grid excitation furnished by this transformer is 180 electrical degrees out of phase with respect to the voltage impressed on the anode and cathode of this electric valve. If desired, a further biasing means, such as a self-biasing circuit comprising a parallel connected capacitance 50 and a resistance 50', may also be connected to grid 47 of electric valve 46. In order to overcome the effect of the biasing potentials in response to the conductivity or current conducted by electric valve 45, I employ a transformer 51 having a primary winding 52 connected to be energized in response to the current conducted by electric valve 45. Secondary winding 53 of this transformer is connected in circuit with the means which provides the two above-mentioned biasing potentials. Transformer 51 may also be provided with another winding 54 which is energized in series relation with circuit 44 and grid 47 of electric valve 45 in order to prevent shift in phase of the voltage impressed on grid 47 of electric valve 46.

The control electric valves 14 in excitation circuits 12 and 13, and hence the main electric valves 2 and 3, are rendered conducting alternately by the conjoint action of the alternating voltages introduced into the transformers 48 and the peaked voltages produced by peaking transformers 23. As a means for controlling the time during the half cycles of voltage of circuit 8 at which the electric valves 2 and 3 begin to conduct current, and hence for controlling the magnitude of an electrical condition such as the current of load circuit 1, I provide phase shifting means 55 for controlling the phase of the periodic voltage of peaked wave form produced by the peaking transformers 23. The phase shifting means 55 may be of the static impedance type, that is of the type comprising various combinations of resistance, inductance and capacitance, and in the arrangement illustrated comprises a transformer 56 and a bridge network which includes one parallel path comprising a variable impedance element, such as a variable impedance 57 having a variable resistance component and a resistance 58. The other parallel path includes a second variable or adjustable impedance element, such as resistance 59 having an adjustable contact 60 and a capacitance 61. Output circuit 62 of the phase shifting means 55 is connected to the primary windings 24 of transformers 23.

The effective value of the impedance 57 may be controlled by arranging the impedance 57 to have a winding 63 provided with an intermediate connection 64, and by employing a pair of electric valves 65 and 66 preferably of the high-vacuum type each provided with a grid 67. As the electric valves 65 and 66 are caused to conduct different amounts of current by variations in the potential of the grids 67, the effective impedance of element 57 varies to control the phase relation of the alternating voltage supplied to output circuit 62.

I provide control means 68 which varies the potential of the grids 7 of electric valves 65 and 66 and which thereby controls the amount of current transmitted by the electric valve means 2 and 3 by varying or controlling the phase of the voltage of peaked wave form produced by peaking transformers 23. This control means may comprise an amplifier 69 which is energized from a suitable source of direct current 70. The source of direct current 70 may be provided by means of a rectifier 71 and a filtering circuit 72. Amplifier 69 comprises an electric discharge device 73, preferably of the high vacuum type, comprising an anode 74, a cathode 75, a control grid 76 and a screen grid 77. The cathode 75 is maintained at a predetermined potential above the negative terminal of the direct current source 70 by means of a constant voltage device, such as a glow discharge valve 78. A variable control potential is produced by means of an impedance element, such as a resistance 79, connected in the anode-cathode circuit of electric discharge device 73. Output circuit 80 of the amplifier 69 may be connected between resistance 79 and the anode of discharge device 73 and a part of a voltage divider including resistances 81, 82, 83 and 84 which are energized from the direct current source 70. The voltage divider may be provided with an adjustable connection 85 which adjusts the range of control voltage produced in the output circuit 80.

The control means 68 also comprises an electric discharge device 86 which comprises an anode 87 and a cathode 88 of the filamentary type having a heating element or filament 89. Although the electric discharge device 86 is illustrated as being of the type in which the cathode 88 is indirectly heated, it will be understood that I may employ a discharge device of the type in which the cathode is directly heated. By the term "electric discharge device of the filamentary type," I intend to cover that type of electric discharge device wherein the emission of the cathode may be controlled by variation of the cathode temperature occasioned by transmitting different amounts of current to an element of the device.

A suitable source of current, such as a direct current source 90, may be employed for energizing the anode-cathode circuit of discharge device 86. The source 90 may be supplied by means of a rectifier 91 and a filtering circuit 92. As a means for supplying a substantially constant voltage to the electric valve circuit of discharge device 86, I provide a voltage divider comprising a serially connected resistance 93 and a constant voltage device, such as a glow discharge valve 94, which maintains across its terminals a substantially constant voltage when in a conducting condition. A further resistance 95 may be connected across glow discharge valve 94. Variable amounts of unidirectional current are transmitted through a resistance 96 which is connected in series relation with the anode-cathode circuit of discharge device 86. The positive terminal of resistance 96 is connected to the control grid 76 of electric discharge device 73 in the amplifier circuit 69 through conductor 97, and a current limiting resistance 98. The negative terminal of the resistance 96 may be connected to the adjustable connection or tap 85 of resistance 83 through a conductor 99.

Although the electric discharge device 86 is illustrated as being of the type in which the cathode 88 is indirectly heated, it will be understood that I may employ a discharge device of the type in which the cathode is directly heated. By the term "electric discharge device of the filamentary type," I intend to cover that type of electric discharge device wherein the emission of the cathode may be controlled by variation of the cathode temperature occasioned by transmitting different amounts of current to an element of the device.

Variations in the conductivity of electric discharge device 86 are employed as the means for producing the variable control potential across resistance 96. More specifically, I provide means for transmitting variable amounts of current to filament 89 in accordance with a predetermined controlling influence, such as an electrical condition of the load circuit 1. In the particular embodiment of my invention illustrated, the current of load circuit 1 is employed as the controlling influence. For example, a current transformer 100 may be connected in series with the load circuit 1 and employed to energize a transformer 101.

I provide means for energizing the filament 89 during the periods of energization of the load circuit 1. As a means for connecting the filament 89 to the transformers 100 and 101, I employ suitable means, such as a relay 102, which comprises an actuating coil 103 and may include contacts 104 and 105, the latter of which are connected in series relation with secondary winding 106 of transformer 101 and the filament 89 of electric discharge device 86. When the relay 102 is in the energized position, contacts 105 are closed. Adjustable means for controlling the conductivity of the electric discharge device 86, and hence for establishing the magnitude of the current which is maintained in the load circuit 1, is connected in circuit with the filament 89. This means may comprise an adjustable resistance 107, or an adjustable impedance, such as resistance 108, may be connected across secondary winding 106 if desired. The voltage appearing across resistance 108 varies in accordance with the load current.

In order to increase the accuracy and speed of response of the regulating or control circuit, I provide means for pre-setting or pre-conditioning the electric discharge device 86 and the associated control means prior to each energization of the load circuit 1. Of course, when the load circuit 1 is energized intermittently or periodically, the pre-setting or pre-conditioning is effected during each period of time intermediate the periods of energization of the load circuit. This pre-conditioning means may comprise an auxiliary means 109 which may be energized from circuit 22 and may include a transformer 110 and a ballast resistance 111 which effect the transmission of a substantially constant current through a resistance 112. This resistance is provided with an adjustable contact 113 which controls the value of current which is transmitted to filament 89. The auxiliary means 109 may be adjusted to transmit to filament 89 a current of a value which corresponds to the magnitude of the electrical condition, such as the current which it is desired to maintain in the load circuit 1. Contact 113 is connected in circuit with the normally closed contacts 104 of relay 102 and the filament 89 of the electric discharge device 86. Relay 102 selectively energizes the filament 89 of discharge device 86 from the auxiliary means 109 or from transformer 101. Inasmuch as contacts 104 are arranged to be closed when contacts 105 are open, the auxiliary means 109 energizes the filament 89 when the load circuit 1 is deenergized. This action is accomplished by virtue of the fact that the actuating coil 103 is energized only when current flows in the load circuit 1.

As a means for adjusting the magnitude of the current transmitted to filament 89 of discharge device 86, and hence as a means for establishing the degree of conductivity of the electric discharge device 86 in accordance with the magnitude of the current which it is desired to be maintained in the load circuit 1, I provide interlocking means 114 which is connected between the adjustable connection 113 of auxiliary means 109 and the adjustable connection 60 of the variable impedance element 59 of the phase shifting means 55.

The interlocking means 114 may be connected to the movable contact of resistance 108 instead of being connected to the movable contact 113 of resistance 112. Of course, the interlocking means 114 may be connected to both resistances 108 and resistances 112. Where the electric discharge device 89 is of the type which makes it desirable to limit the variation of current to the cathode or the cathode heating element in order to obtain the desired regulatory operation of the system, it may be preferable to interlock only resistance 59 and resistance 108. Furthermore, as illustrated in Fig. 1, it may be desirable to interlock all three elements, that is to interlock resistances 59, 112 and 108.

In order to initiate operation of the system, I may provide a suitable means, such as a manually operable switch 15, which may be connected in circuit with the peaking transformer 41 of the timing means 27. A suitable phase shifting device, such as a rotary phase shifter 116, may be connected between circuit 33 and the transformer 41 to control the phase relationship of the peaked voltage produced thereby, and hence to vary the time at which the generation of the timing voltages are initiated during the half cycles of voltage of circuit 33 and circuit 8.

The operation of the embodiment of my invention shown in Fig. 1 will be explained by considering the system when it is operating to effect intermittent or periodic energization of the load circuit 1. Until switch 115 is closed, the control electric valves 14 and the power or main electric valves 2 and 3 are maintained in a nonconducting condition; therefore, no current is transmitted to load circuit 1. Upon closure of switch 115, peaking transformer 41 is energized, and upon the generation of a voltage of peaked wave form the electric valve 37 will be rendered conducting, effecting discharge of the capacitance 35 which has previously been charged from the direct current source including conductors 28 and 29. The period of time during which the periodic voltage produced by timing means 27 is effective to render the coupling electric valve 45 conducting is controllable or adjustable by means of variable resistance 36 and adjustment of the contact 34' of resistance 34. It will be noted that a negative biasing potential is impressed on grid 47 of electric valve 45, and that the time during which the electric valve 45 conducts current is determined by the relative magnitudes of the voltage derived from resistance 36 and the biasing potential derived from resistance 34. In this manner, it is possible to control the number of half cycles of alternating current transmitted to transformers 48 and, hence, control the period of energization of the load circuit 1.

Inasmuch as the coupling electric valve 46 is arranged to follow electric valve 45, an even number of half cycles of alternating current will be transmitted by these electric valves.

The negative biasing potentials impressed on grids 15 of control electric valves 14 are sufficient to maintain the electric valves nonconducting in the absence of the alternating voltages introduced in the excitation circuits 12 and 13 by transformers 48, inasmuch as the peaked voltages produced by transformers 23 are not sufficient to overcome the effect of these biasing potentials. However, when transformers 48 are energized, the alternating voltages produced thereby, acting in conjunction with the periodic voltages of peaked wave form, are sufficient to render the electric valves 14 and hence electric valve means 2 and 3 conducting alternately for a predetermined number of half cycles corresponding to the number of half cycles of voltage during which the transformers 48 are energized. The time during the respective positive half cycles of anode-cathode voltage at which the electric valves 2 and 3 are rendered conducting is determined principally by the phase position of the periodic voltages of peaked wave form produced by transformers 23.

The phase shifting circuit 55 and the control means 68 serve to control the phase relation of the periodic voltages of peaked wave form to maintain the load current at a precise value. Prior to the energization of load circuit 1, the auxiliary means 109 has pre-conditioned or preset the conductivity of the electric discharge device 86 to a value which corresponds to the value of current which it is desired to maintain in the load circuit. This pre-setting value may be obtained by adjustment of resistance 112.

Upon energization of the load circuit 1, actuating coil 103 of relay 102 is energized through transformers 100 and 101, thereby closing contacts 105 and opening contacts 104, the latter of which disconnect the auxiliary means 109 from the filament 89. Upon closure of contacts 105, filament 89 is energized in accordance with the load current. If it be assumed that the load current tends to increase above the desired value, the energization of the filament 89 is correspondingly increased effecting an increase in the anode-cathode current conducted by discharge device 86 and thereby raising the potential of control grid 76 of discharge device 73 in the amplifier circuit 69. Consequently, the discharge device 73 conducts an increased amount of current through resistance 79, lowering the potential of grids 67 of electric valves 65 and 66. These electric valves conduct a smaller amount of current through winding 63, and thereby increase the effective resistance of element 57 and effect a retardation in phase of the alternating voltage supplied to the peaking transformers 23. This retardation in phase causes the electric valves 14 and the power electric valve means 2 and 3 to be rendered conducting at later times during the positive half cycles of anode-cathode voltage, and consequently effect a reduction in the magnitude of the load current to the desired value. The control system also responds to raise the load current to the desired value if it tends to decrease below that value.

The magnitude of the current which is transmitted to the load circuit 1 may, of course, be adjusted by means of the variable impedance element 59 of phase shifting circuit 55. By virtue of the interlock or coupling 114, the resistance 112 of the auxiliary means 109 is also automatically and simultaneously adjusted to change the pre-set condition or conductivity of electric discharge device 86 so that the degree of conductivity of this discharge device is always pre-set to correspond to the value of current which it is desired to maintain in the load circuit.

When the system is operated intermittently, it will be understood that relay 102 is deenergized between the periods of energization of the load circuit, and that the auxiliary means 109 during these intervals maintains the conductivity of the discharge device 86 at the desired value, so that the system is always in a condition susceptible of obtaining a high degree of accuracy irrespective of the intermittent operation of the translating apparatus.

Due to the fact that the electric valve means 2 and 3 are connected reversely in parallel, alternating current is transmitted to the load circuit 1. The magnitude or effective value of the alternating current is determined by the time during the respective positive half cycles of applied anode-cathode voltage at which the electric valve means are rendered conducting.

I have found that where it is desired to obtain limitation of the current transmitted to the welding circuit during the initiation of each period of energization, the resistance 112 may be adjusted to furnish at first a signal which indicates a larger value of current in the load circuit than that which it is desired to be maintained. This means that the discharge device 86 initially conducts a slightly larger value of current, thereby effecting a retardation in phase of the alternating voltage supplied to output circuit 62 of phase shifting means 65, and correspondingly retards the phase of the voltages of peaked wave form of excitation circuits 12 and 13. In some applications where a relatively large number of half cycles of current are transmitted consecutively to the load circuit, it is important to maintain the first few half cycles of current at a slightly lower value than the succeeding half cycles, in which case the auxiliary means 109 is adjusted to transmit a current to the filament 89 which is larger than the reference current which the system is designed or adjusted to maintain. After the occurrence of the first few half cycles under this condition of operation, the control system takes over the control to maintain accurately the larger value of load current.

It will be understood that the auxiliary means 109 may be adjusted so that the current transmitted to the load circuit 1 at the beginning of each period of energization is larger than that which is ultimately maintained therein after the current responsive means becomes effective. In this manner, the few initial half cycles of energization of the load circuit may be characterized by having a current of different value than that which is transmitted and maintained in the load circuit after the current responsive means assumes control.

Resistance 108 may also be employed as a means for adjusting the magnitude of the load current which is maintained and, if desired, the resistance 108 may be operated simultaneously with the variable impedance element 59 in the phase shifting circuit 55. Suitable interlocking or coupling means may be provided between these two elements of the system, if desired.

While I have illustrated my invention as applied to a system in which an intermittent or periodic energization of the load circuit is obtained by the closure of a switch, such as the manually operable switch 115, it will be understood that my invention is not limited thereto and may be applied to those arrangements where a single energization or period of energization of the load circuit is obtained in response to a single circuit controlling operation.

Figure 2:
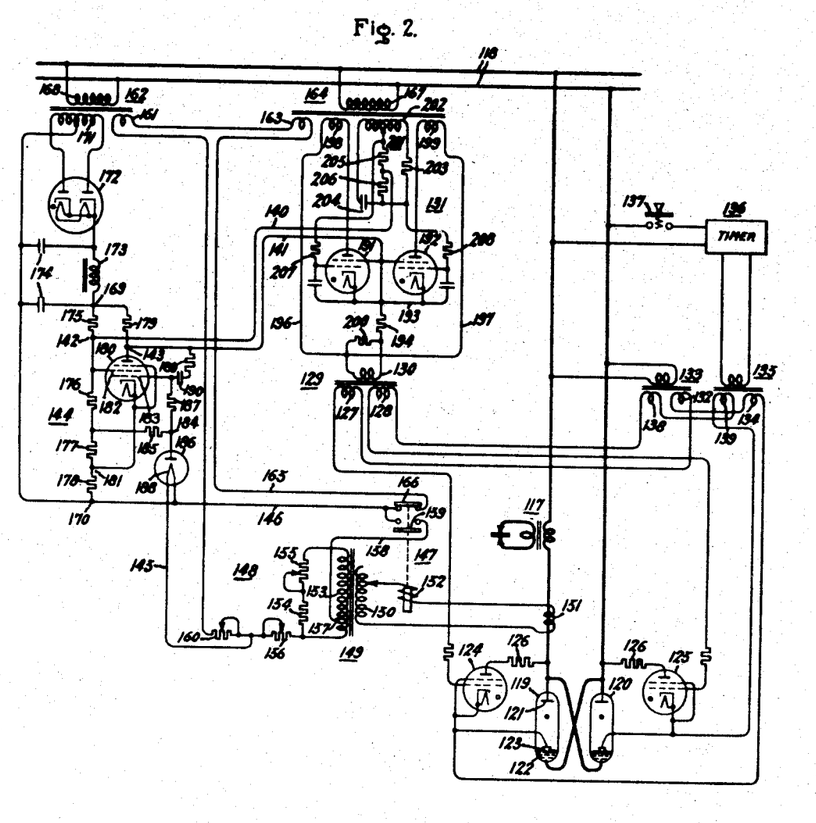
Fig. 2 illustrates a modification of my invention.

In Fig. 2, I have illustrated another embodiment of my invention which is, in general, similar to the arrangement of Fig. 1 and which offers some advantages with respect to simplicity of design and range and accuracy of the control accomplished. Referring now to Fig. 2 of the drawing, the power circuit is, in general, the same as the circuit shown in Fig. 1 and may be any of the known electric valve-controlled systems in which the magnitude of the load current is controlled by a variable voltage and, preferably by a voltage of peaked wave form which is shifted in phase. Referring now to Fig. 2, a welding transformer 117 is energized from an alternating current supply circuit 118 through electric discharge devices 119 and 120, which are reversely connected in parallel between the supply circuit and the welding transformer. The valves 119 and 120 are preferably of the same type as the valves 2 and 3 of Fig. 1 and each comprises an anode 121, a cathode 122, and an immersion-ignitor type of control member 123. Initiation of conduction in valves 119 and 120 is controlled by electric valves 124 and 125, respectively. As illustrated, the anode-cathode circuit of electric valve 124 is connected in series with a suitable resistor 126 and between the anode 121 and control member 123 of electric valve 119. Electric valve 125 is similarly connected with respect to valve 120. Thus, the anode-cathode voltage of the control electric valves 124 and 125 is derived from the anode-cathode voltages of electric valves 119 and 120, respectively. The precise time in the positive anode-cathode voltage of the associated valves at which the control valves 124 and 125 are rendered conductive is determined by means of positive peaked voltages impressed on the control members of these valves by the secondary windings 127 and 128, respectively, of a transformer 129, the primary winding 130 of which is shock excited by an excitation circuit illustrated generally by the numeral 131. In addition to the peaked voltage of winding 127, the cathode-to-control-member circuit of electric valve 124 includes a secondary winding 132 of a transformer 133 and a secondary winding 134 of a transformer 135. The primary winding of transformer 133 is energized from the alternating current supply circuit 118 and the secondary winding 132 thereof is connected to impress an alternating current hold-off voltage on the control member of valve 124. The primary winding of transformer 135 is energized from the alternating current supply circuit 118 under the control of a timer illustrated generally by the numeral 136 and the operation of which may be initiated by a suitable switch 137 connected between the supply circuit 118 and the timer 136. The magnitude of the voltage impressed on the control member of electric valve 124 is not sufficient in itself to render the valve conductive but overcomes the hold-off voltage impressed on the control member by winding 132 to such an extent that electric valve 124 and, as a result, the electric valve 119 is rendered conductive at the instant that a positive voltage peak appears in the transformer winding 127. The control-member circuit of electric valve 125 is essentially the same as that described in connection with electric valve 124 and includes in series the secondary winding 129 of transformer 130, a secondary winding 138 of transformer 133, and a secondary winding 139 of transformer 135. From the above description, it is apparent that the magnitude of the current supplied to the welding transformer and, as a result, the heat applied to the material to be welded may be adjusted and regulated by controlling the phase position of the peaked voltages induced in windings 127 and 128.

The phase position of the peaked voltages induced in windings 127 and 128 is controlled by a variable unidirectional voltage appearing across conductors 140 and 141 which is derived from the output terminals 142 and 143 of an amplifying and regulating circuit illustrated generally by the numeral 144. The input to the circuit 144 is impressed on the conductors 145 and 146 from either of two sources under the control of a relay device 147. The relay functions to energize the conductors selectively in accordance with a condition of the load circuit when it is energized and in accordance with a condition of the supply circuit during intervals when the load circuit is deenergized. Referring now to the circuit 148, a voltage dependent upon the magnitude of the current supplied to the welding transformer is derived from a current transformer 149 having a primary winding 150 thereof energized from a current transformer 151 operatively associated with the circuit of the welding transformer. The operating coil 152 of the relay 147 is connected in series with the primary winding 150. The secondary winding 153 of the transformer 149 is loaded by a resistor 154 and an adjustable resistor 155 which are connected in series and across the terminals of the winding 153. One terminal of the winding 153 is connected with the conductor 145 through an adjustable resistor 156, and an intermediate terminal 157 of winding 153 is connected with a conductor 158 arranged to be connected with conductor 146 through a contact 159 of the relay 147. From an inspection of the circuit just described, it is apparent that a voltage is impressed across the conductors 145 and 158 which bears a definite relation to the magnitude of the load current which is being supplied to the welding transformer and that the relative magnitudes of the welding current and the voltage impressed on these conductors are controlled by adjustable resistances 155 and 156. If the resistance of 155 is increased, a smaller current in the welding transformer is required to produce a given voltage between conductors 145 and 146 and, conversely, a decrease in the magnitude of resistance 155 increases the current in the load for a given voltage of conductors 145 and 158. In other words, maximum setting of resistance 155 is the minimum heat setting. In order to provide a source of control voltage for conductors 145 and 146 when the welding circuit is deenergized, I connect conductor 145 through an adjustable resistance 160, the secondary winding 161 of a transformer 162, and the secondary winding 163 of a transformer 164 to a conductor 165 which is arranged to be connected with the conductor 146 through a normally closed contact 166 of the relay 147. The transformer 164 has the primary winding 167 energized from the supply circuit 118 and produces a voltage in winding 163 which varies in magnitude with voltage fluctuations in the supply circuit. Transformer 162 is a regulating transformer and has the primary winding 168 thereof energized from the alternating current supply circuit 118 to produce a voltage in winding 161 which is independent of voltage fluctuations in the supply circuit. By proper proportioning of the voltages produced by windings 161 and 163, a resultant voltage which varies with fluctuations in the supply circuit voltage may be produced which will provide reasonably good compensation for the supply line fluctuation. The magnitude of the voltage impressed on conductors 145 and 146 by transformer windings 161 and 163 is adjusted to the proper value for a given heat setting by adjustment of resistor 160.

The regulating and amplifying circuit 144 which produces a variable unidirectional voltage across output terminals 142 and 143 in response to variations to the voltage impressed on conductors 145 and 146 will now be described in detail. The circuit 144 is energized by the direct current voltage appearing across terminals 169 and 170 and which is derived from a secondary winding 171 of transformer 168 by means of a full-wave rectifier circuit including a gaseous-discharge device 172 and a filter circuit including a series reactor 173 and shunt capacitors 174. The circuit 144 is essentially a bridge-type circuit including two parallel electric circuits energized in accordance with the voltage across the terminals 169 and 170. As illustrated in the drawings, resistors 175, 176, 177, and 178 are connected in series across these terminals. A resistor 179 and the anode-cathode circuit of an electric valve 180 are connected in series between the terminal 169 and a terminal 181 intermediate resistors 177 and 178. The output terminal 142 of the bridge circuit is located between resistors 175 and 176 and the output terminal 143 is located between the resistor 179 and the anode of valve 180. The valve 180 is preferably of the high vacuum type and includes a screen grid 182, which is electrically connected to the output terminal 142, and a control member or grid 183 which is connected to an intermediate terminal 184 on a voltage dividing circuit including a resistor 185 and an electric valve 186 connected in series across resistors 177 and 178. The connection between the grid 183 and terminal 184 includes a suitable current limiting resistor 187. The electric valve 186 is preferably a diode having a cathode of low heat-storage capacity and which is operated emission-limited, that is, the conductivity of the valve is limited by the emission of the cathode, which is, in turn, regulated by controlling the current supplied thereto. As illustrated in the drawing, the filament 188 of the valve 186 is energized in accordance with the voltage of conductors 145 and 146. A suitable stabilizing circuit for stabilizing the operation on the amplifier circuit is connected from the terminal 143 to the control member 183 and comprises in series a resistor 189 and a capacitor 190. From an inspection of the drawing, it will be seen that the cathode-to-control-member circuit of electric valve 180 includes resistor 177 which provides a source of positive bias and the resistor 185 which provides a source of negative bias which increases as the conductivity of the electric valve 186 increases. From an inspection of the drawing, it is seen that resistors 177, 178, 185, and valve 186 form a bridge circuit having output terminals 181 and 184.

Before describing the operation of the system as a whole, a brief description of the excitation circuit 131, which produces peaked voltages in the windings 127 and 128 which vary in phase relation in accordance with changes in magnitude of the voltage impressed on conductors 140 and 141, will be given. This circuit is, in general, similar to the circuit described and claimed in copending Bivens application, Serial No. 460,249, filed September 30, 1942, entitled "Electric control circuit," and assigned to the assignee of the present application. The circuit 131 comprises electric valves 191, 192, preferably of the gaseous-discharge type and which have the cathodes thereof electrically connected together by conductor 193. Conductor 193 is connected through a resistor 194 and the primary winding 130 of transformer 129 to conductors 196 and 197. Conductor 196 is connected with the anode of electric valve 191 through a secondary winding 198 on transformer 164 and conductor 197 is connected with the anode of electric valve 192 to a secondary winding 199 on transformer 164. Thus the primary winding 130 is connected in the anode-cathode circuits of both electric valves 191 and 192. A suitable resistor 200 is connected across the primary winding 130 to limit the terminal voltage produced by decay of flux in the core of transformer 129. The instants in the voltage wave of the alternating current supply circuit 118 at which electric valves 191 and 192 are rendered conductive is determined by the voltage across the conductors 140 and 141 which is superimposed on an alternating current component of voltage derived from a phase-shifting circuit 201 and impressed on the control members of the electric valves 191 and 192. The phase-shifting circuit includes a center tapped transformer secondary winding 202 of transformer 164 across the terminals of which is connected in series a resistor 203 and a capacitor 204. The intermediate terminal of winding 202 is connected to the common terminal of resistance 203 and capacitance 204 by series resistances 205 and 206. As illustrated in the drawing, the cathodes of the electric valves 191 and 192 are connected through conductor 141 and conductor 140 to the common terminal of resistances 205 and 206. The control member of electric valve 191 is connected from the other terminal of resistance 205 through a current limiting resistor 207 and the control member of electric valve 192 is connected with the other terminal of resistance 206 through a current limiting resistor 208. From a consideration of the drawing and the circuits just described, it will be apparent that voltage across resistances 205 and 206 may be substantially 90 degrees lagging in phase with respect to the voltage of the winding 202 and the voltages impressed on the control members of valves 191 and 192 by resistors 205 and 206 will be displaced 180 degrees with respect to each other. Electric valves 191 and 192 are, in this way, rendered conductive at intervals displaced 180 electrical degrees for a given magnitude of voltage impressed on conductors 140 and 141.

The operation of the system illustrated in Fig. 2 is as follows: Let it be assumed that the supply circuit 118 is energized and all of the electric valves are at proper operating temperature. If switch 137 is open, the welding transformer is deenergized and relay 147 is deenergized. Under these conditions, contact 166 is closed and the filament 188 of electric discharge device 186 is energized from conductors 145 and 165 in accordance with the setting of resistance 160, which has been adjusted in accordance with the phase position of the voltage peaks of windings 127 and 128 which is desired to be maintained when the load circuit is deenergized. This may be either as closely as possible to the phase position required for the desired magnitude of welding current or slightly less advanced to insure that the first cycle or so of welding current will not exceed the desired value. The voltage across conductors 145 and 165, therefore, produces a predetermined energization of the filamentary cathode 188 of electric valve 186 and, therefore, establishes the voltage across conductors 140 and 141 and the resultant phase position of the voltage peaks produced in transformer windings 127 and 128. As mentioned earlier in the specification, transformer 162 is a regulating transformer and transformer 164 is an unregulated transformer so that the voltage across conductors 145 and 164 will fluctuate in accordance with supply-line voltage fluctuations and, in this way, the control system operates as a compensator during the period that the load circuit is deenergized. During this period, the main electric valves 119 and 120 have been maintained nonconductive by the hold-off voltages of transformer windings 132 and 138. If, now, it is desired to initiate a period of energization of the load circuit or a succession of such periods if the timer circuit is arranged for seam welding, the switch 137 is closed and the transformer windings 134 and 139 are energized with alternating voltage having a phase relation tending to render the electric control valves 124 and 125 conductive and which do render the valves conductive at the occurrence of the next positive voltage peaks across windings 127 and 128. During the first cycle or so of energization of the load circuit, the instant of initiation of conduction in electric valves 119 and 120 is determined by the control voltage of conductors 145 and 165 which has been previously adjusted in accordance with the particular magnitude of welding current for which the system is adjusted. As soon as the welding transformer is energized, current transformer 151 energizes the primary winding 150 of transformer 149 to produce a voltage having a magnitude directly related to the magnitude of the welding current. At the same time, the operating coil 152 of relay 147 is energized to disconnect the filamentary cathode 188 from conductor 165 and connect it with conductor 158 through contact 159 and, in this way, energize the filament in accordance with the actual welding current. If the welding current is below that for which the system has been adjusted by resistor 155 or resistor 156, the heating of filament 188 will be below the regulating level and terminal 184 will be less negative. This increases the conductivity of the amplifier valve 180 to depress the terminal 143 with respect to terminal 142. In other words, this increases the positive bias on electric valves 191 and 192 and cooperates with the alternating current component of voltage produced by resistors 205 and 206 to advance the instants of conduction of electric valves 191 and 192 and, as a result, to advance the voltage peaks induced in windings 127 and 128 and, in this way, raise the welding current to the desired value. If the welding current is higher than that for which the regulator is set, the action is the converse of that which has just been described. In the foregoing description, the voltage of terminals 142 and 143 has been referred to as a unidirectional voltage. It will be understood that, under certain ranges of operation and for given values of resistors 175 and 179, this voltage may reverse in polarity.

While I have shown and described particular embodiments of my invention, it will be obvious to those skilled in the art that changes and modifications may be made without departing from my invention in its broader aspects, and I, therefore, aim in the appended claims to cover all such changes and modifications as fall within the true spirit and scope of my invention.

What I claim as new and desire to secure by Letters Patent of the United States is:

1. In combination, a supply circuit, a load circuit, electric translating apparatus connected between said circuits, control means for said translating apparatus including timing means for effecting intermittent energization of said load circuit, an electric discharge device having an anode and a cathode of the filamentary type and an amplifier connected between said electric discharge device and said translating apparatus, means for energizing said cathode in response to a predetermined electrical condition of said load circuit during periods of energization thereof, and means for maintaining the energization of said filament at a predetermined level during the period of time intermediate the periods of energization.

2. In combination, a supply circuit, a load circuit, electric translating apparatus connected between said circuits, control means for said translating apparatus for effecting intermittent energization of said load circuit and comprising an electric discharge device having an anode and a cathode of the filamentary type and an amplifier connected between said electric discharge device and said translating apparatus, means for energizing said cathode in response to a predetermined electrical condition of said load circuit, means for energizing said cathode to establish a predetermined conductivity of said discharge device prior to each energization of said load circuit, and means controlled in accordance with the periods of energization of said load circuit for transferring the energization of said cathode from one of said last two mentioned means to the other.

3. In combination, a supply circuit, a load circuit, electric translating apparatus connected between said circuits, control means for said translating apparatus including timing means for effecting intermittent energization of said load circuit, an electric discharge device having an anode and a cathode of the filamentary type, means for energizing said cathode in response to a predetermined electrical condition of said load circuit during the periods of energization thereof, and means for energizing said cathode during the periods of time intermediate the periods of energization of said load circuit to establish a predetermined conductivity of said electric discharge device corresponding to a predetermined value of said electrical condition.

4. In combination, a supply circuit, a load circuit, electric translating apparatus connected between said circuits for effecting intermittent energization of said load circuit, control means for controlling the operation of said translating apparatus and comprising an electric discharge device having an anode and a cathode of the filamentary type, means for energizing said cathode in response to the current transmitted between said supply circuit and said load circuit during the periods of energization of said load circuit, means for energizing said cathode at a predetermined rate during the periods of time intermediate the periods of energization of said load circuit, and means controlled in accordance with the periods of energization of said load circuit for transferring the energization of said cathode from one of said last two mentioned means to the other.

5. In combination, a supply circuit, a load circuit, electric translating apparatus connected between said circuits and comprising electric valve means, control means for said electric valve means for effecting intermittent energization of said load circuit, said control means comprising an electric discharge device having an anode and a cathode of the filamentary type, means for energizing said cathode in response to a predetermined electrical condition of said load circuit during the periods of energization of said load circuit, means for preestablishing a predetermined conductivity of said electric discharge device prior to each energization of said load circuit, and means controlled in accordance with the periods of energization of said load circuit for transferring the energization of said cathode from one of said last two mentioned means to the other.

6. In combination, a supply circuit, a load circuit, electric translating apparatus connected between said circuits and comprising electric valve means, control means for said electric valve means for effecting intermittent energization of said load circuit, said control means comprising an electric discharge device having an anode and a cathode of the filamentary type, means for energizing said cathode in response to a predetermined electrical condition of said load circuit during the periods of energization of said load circuit, means for energizing said cathode to establish a predetermined degree of conductivity of said electric discharge device during the periods of time when the load circuit is not energized, and means controlled in accordance with the periods of energization of said load circuit for transferring the energization of said cathode from one of said last two mentioned means to the other.

7. In combination, an alternating current supply circuit, a load circuit, electric translating apparatus connected between said circuits and comprising electric valve means having a control member, control means connected to said control member for controlling an electrical condition of said load circuit and for effecting intermittent energization of said load circuit, said control means comprising means for impressing on said control member a periodic voltage of variable phase displacement with respect to the voltage of said supply circuit and including an electric discharge device having an anode and a cathode of the filamentary type, and means for energizing said cathode in response to said electrical condition and for controlling the phase relation of said periodic voltage relative to the voltage of said supply circuit.

8. In combination, an alternating current supply circuit, a load circuit, electric translating apparatus connected between said circuits and comprising electric valve means having a control member, control means connected to said control member for controlling a predetermined electrical condition of said load circuit and for effecting intermittent energization of said load circuit, said control means comprising means for impressing on said control member a periodic voltage of variable phase displacement with respect to the voltage of said supply circuit and including an electric discharge device having an anode and a cathode of the filamentary type, means for energizing said cathode in response to said electrical condition and for controlling the phase relation of said periodic voltage relative to the voltage of said supply circuit, and means for energizing said cathode to establish a predetermined conductivity of said electric discharge device during the periods intermediate the periods of energization of said load circuit.

9. In combination, an alternating current supply circuit, a load circuit, electric translating apparatus connected between said circuits and comprising electric valve means having a control member, control means connected to said control member for effecting intermittent energization of said load circuit and for controlling the magnitude of the current transmitted to said load circuit during each period of energization thereof and control means comprising phase shifting means for impressing on said control member a voltage variable in phase with respect to the voltage of said supply circuit, an electric discharge device having an anode and a cathode of the filamentary type, amplifier means connected between said discharge device and said phase shifting means, and means responsive to the current of said load circuit for variably energizing said cathode in response to the current of said load circuit.

10. In combination, an alternating current supply circuit, a load circuit, electric translating apparatus connected between said circuits and comprising electric valve means having a control member, control means connected to said control member for effecting intermittent energization of said load circuit and for controlling the magnitude of the current transmitted to said load circuit during each period of energization thereof, control means comprising phase shifting means for impressing on said control member a voltage variable in phase with respect to the voltage of said supply circuit, an electric discharge device having an anode and a cathode of the filamentary type, amplifier means connected between said discharge device and said phase shifting means, means responsive to the current of said load circuit for variably energizing said cathode in response to the current of said load circuit, and means for energizing said cathode to establish a predetermined conductivity of said discharge device prior to each energization of said load circuit.

11. In combination, a source of direct current, an output circuit, means connected between said source of direct current and said output circuit and comprising an impedance element connected in series with an electric discharge device having an anode and a cathode of the filamentary type, means for maintaining the voltage across said serially connected impedance and discharge device at a substantially constant value comprising a glow discharge valve, means for variably energizing said cathode in response to a predetermined controlling influence and for varying an electrical condition of said output circuit in accordance with said controlling influence, means for pre-establishing a predetermined energization of the cathode of said discharge device prior to the time said controlling influence becomes effective, and means for rendering said last mentioned means ineffective when said controlling influence becomes effective.

12. In combination, a source of direct current, an output circuit, means connected between said source and said output circuit and comprising an impedance element connected in series with an electric discharge device having an anode and a cathode of the filamentary type, a glow discharge valve connected to said source for maintaining the voltage derived from said source and impressed on said serially connected impedance and discharge device at a substantially constant value, means for variably and intermittently energizing said cathode in response to a predetermined controlling influence and for controlling a predetermined electrical condition of said output circuit in accordance with said controlling influence, and means comprising a substantially constant current circuit for energizing said cathode to establish a predetermined conductivity of said discharge device prior to each energization of said cathode by said last mentioned means.

13. In combination, an alternating current supply circuit, a load circuit, electric translating apparatus connected between said circuits and comprising electric valve means having a control member for controlling the conductivity thereof, excitation means for controlling the magnitude of the current transmitted to said load circuit and comprising phase shifting means for supplying to said control member a periodic voltage of variable phase displacement with respect to the voltage of said supply circuit, said phase shifting means comprising means for adjusting the phase relation of said periodic voltage relative to the voltage of said supply circuit, means for controlling said phase shifting means comprising an electric discharge device having an anode and a cathode of the filamentary type, means for energizing said cathode in response to said load current, means for transmitting to said cathode a predetermined value of current prior to the energization of said load circuit and for establishing a predetermined conductivity of said electric valve means, and means connected between the last mentioned means and said phase shifting means for adjusting simultaneously the phase relation of said periodic voltage and the magnitude of the current transmitted to said cathode.

14. In combination, an alternating current supply circuit, a load circuit, electric translating apparatus connected between said circuits and comprising electric valve means having a control member for controlling an electrical condition of said load circuit, excitation means for supplying to said control member a periodic voltage and comprising phase shifting means for controlling the phase relation of said periodic voltage relative to the voltage of said supply circuit, control means for said phase shifting means comprising an electric discharge device comprising an anode and a cathode of the filamentary type, means for variably energizing said cathode in accordance with said electrical condition, means for transmitting to said cathode a predetermined value of current and for establishing a predetermined conductivity of said discharge device corresponding to the value of said electrical condition which is to be maintained, and means connected between the last mentioned means and said phase shifting means for simultaneously adjusting the phase relation of said periodic voltage and the magnitude of the current which is transmitted to said cathode.

15. In combination, an alternating current supply circuit, a load circuit, electric translating apparatus connected between said circuits and comprising electric valve means including a control member, excitation means for impressing on said control member a periodic voltage the phase relation of which is varied with respect to the voltage of said supply circuit to determine the magnitude of an electrical condition of said load circuit, means for controlling said excitation circuit to effect intermittent energization of said load circuit, phase shifting means connected to said excitation circuit, control means for said phase shifting means comprising an electric discharge device including an anode and a cathode of the filamentary type, means for variably energizing said cathode in accordance with said electrical condition, auxiliary means for transmitting to said cathode a current of predetermined magnitude and for establishing a predetermined conductivity of said discharge device during the intervals of time between the intermittent energizations of said load circuit and corresponding to the magnitude of said electrical condition which is to be maintained, and means for simultaneously adjusting said phase shifting means and said auxiliary means.

16. In combination, an alternating current supply circuit, a load circuit, electric translating apparatus connected between said circuits and comprising electric valve means having a control member, excitation means for impressing on said control member a periodic voltage the phase relationship of which controls the magnitude of the current transmitted to said load circuit, timing means connected to said excitation circuit for effecting intermittent energization of said load circuit, phase shifting means connected to said excitation means and comprising a variable impedance element for adjusting the phase relationship of said periodic voltage relative to the voltage of said supply circuit, control means for said phase shifting means and comprising an electric discharge device having an anode and a cathode of the filamentary type, means for variably energizing said cathode during the periods of energization of said load circuit and in accordance with said load current, auxiliary means for transmitting to said cathode a predetermined value of current during the intervals intermediate the periods of energization of said load circuit and for establishing a predetermined conductivity of said electric discharge device corresponding to the value of said load current which is to be maintained, and means connected between the last mentioned means and said variable impedance element for adjusting the phase relation of said periodic voltage and the current transmitted to said cathode.

17. In combination, a supply circuit, a load circuit, translating apparatus connected between said circuits and comprising control means including an electric discharge device having an anode and a cathode of the filamentary type, means for producing a voltage which varies in accordance with an electrical condition of said load circuit, auxiliary means for supplying current to establish a predetermined conductivity of said discharge device, and means responsive to the energization of said load circuit for selectively energizing said cathode from the means responsive to said electrical condition or said auxiliary means.

18. In combination, a supply circuit, a load circuit, electric translating apparatus connected between said circuits and comprising control means including an electric discharge device having an anode and a cathode of the filamentary type, means for producing a voltage which varies in accordance with a predetermined electrical condition of said load circuit, means for supplying to said cathode a current of predetermined value and including means for adjusting the value of the current to a value corresponding to a larger value of said electrical condition, and means for selectively energizing said cathode from the means responsive to the electrical condition or said auxiliary means in response to the energization of said load circuit whereby the electrical condition initially attains a value lower than said predetermined value and subsequently is raised to said predetermined value a predetermined time after the load circuit is energized.

19. In combination, a supply circuit, a load circuit, electric translating apparatus connected between said circuits, control means for said translating apparatus for controlling the current transmitted to said load circuit at a substantially constant value and comprising an electric discharge device having an anode and a cathode of the filamentary type, current responsive means for producing a voltage which varies in accordance with the current of said load circuit, auxiliary means for supplying to said cathode a current of predetermined value and including means for adjusting the value of current which is transmitted to said load circuit, and means responsive to the energization of said load circuit for selectively energizing said cathode from said current responsive means or said auxiliary means, said auxiliary means being adjusted so that immediately upon energization of said load circuit the value of said load current is somewhat lower than the predetermined value and increases to said predetermined value as the current responsive means becomes effective.

20. In combination, an alternating current supply circuit, a load circuit, electric translating apparatus connected between said circuits and comprising electric valve means having a control member, control means for impressing on said control member a voltage variable in phase with respect to the voltage of said supply circuit and for controlling the current transmitted to said load circuit, said control means comprising an electric discharge device having an anode and a cathode of the filamentary type, current responsive means for producing a voltage which varies in accordance with said load current, auxiliary means for supplying to said cathode a current of predetermined value, and means responsive to the energization of said load circuit for selectively energizing said cathode from said current responsive means or said auxiliary means, the current transmitted to said cathode from said auxiliary means being of a value different from that dictated by the current responsive means so that the current transmitted to said load circuit at the beginning of each period of energization thereof is different from that which exists when said current responsive means assumes control.

21. In combination, a supply circuit, a load circuit, electric translating apparatus connected between said circuits and comprising control means including an electric discharge device having an anode and a cathode of the filamentary type, means for producing a voltage which varies in accordance with a predetermined electrical condition of said load circuit, means for supplying to said cathode a current of predetermined value and including auxiliary means for adjusting the value of the current to a value different from that corresponding to said predetermined value of said electrical condition, and means for selectively energizing said cathode from the means responsive to said electrical condition or said auxiliary means in response to the energization of said load circuit whereby the electrical condition initially attains a value different from said predetermined value until the means responsive to said electrical condition assumes control.

22. In combination, a supply circuit, a load circuit, electric translating apparatus connected between said circuits, means for controlling said translating apparatus comprising a control circuit having an adjustable impedance element, means for controlling the last mentioned means comprising an electric discharge device having an anode and a cathode of the filamentary type, means for producing a voltage which varies in accordance with a predetermined electrical condition of said load circuit and comprising a transformer having a primary winding energized from said load circuit and an adjustable resistance connected across the secondary winding of said transformer, means for energizing said cathode in accordance with said voltage, and means interlocking the first mentioned impedance element and said resistance for controlling the magnitude of the voltage impressed across said cathode in accordance with the adjustment of said first mentioned impedance element.

23. In combination, a supply circuit, a load circuit, electric translating apparatus connected between said circuits and comprising electric valve means having a control member, means for controlling the voltage impressed on said control member comprising a phase shifting circuit having an adjustable impedance element, means for controlling said phase shifting circuit comprising an electric discharge device having an anode and a cathode of the filamentary type, means for variably energizing said cathode in response to a predetermined electrical condition of said load circuit and comprising a transformer having a primary winding energized from said load circuit and an adjustable resistance connected across the secondary winding of said transformer, and interlocking means connected between said impedance element and said resistance for simultaneously adjusting the voltage applied to said cathode in accordance with the movement of said adjustable impedance element.

24. In combination, a supply circuit, a load circuit, electric translating apparatus connected between said circuits and comprising electric valve means having a control member, means for controlling the amount of current transmitted to said load circuit comprising a phase shifting circuit having a variable impedance element, means for controlling said electric valve means to effect intermittent energization of said load circuit, means for controlling said phase shifting circuit comprising an electric discharge device having an anode and a cathode of the filamentary type, means responsive to an electrical condition of said load circuit for controlling the current transmitted to said cathode and comprising a transformer having a primary winding energized from said load circuit and a variable resistance means connected across the secondary winding of said transformer, and interlocking means connected between said variable impedance element and said variable resistance means for controlling the voltage applied to said cathode in accordance with the adjustment of said variable impedance element.

25. In combination, a supply circuit, a load circuit, electric translating apparatus connected between said circuits, means for controlling said translating apparatus comprising a control circuit having an adjustable impedance element, means for controlling the last mentioned means comprising an electric discharge device having an anode and a cathode of the filamentary type, means for producing a voltage which varies in accordance with a predetermined controlling influence derived from said load circuit and comprising a voltage adjusting means, means for energizing said cathode in accordance with said voltage, and means interconnecting said variable impedance element and said voltage adjusting means for controlling the magnitude of the voltage impressed across said cathode in accordance with the adjustment of said impedance element.

26. In combination, an alternating current circuit, an output circuit, a phase shifting circuit connected between said circuits and comprising variable impedance means, an electric valve including a filament, means for variably energizing said filament, presetting means for establishing a predetermined energization of said filament, means for selectively energizing said filament from one or the other of said last two mentioned means, an impedance element energized in accordance with the energization of said filament, and means for controlling said variable impedance means in accordance with the energization of said impedance element.

27. In combination, a supply circuit, a load circuit, electric translating apparatus interconnecting said circuits including electric valve means having a control electrode, a source of direct current voltage, a bridge circuit connected for energization from said source of direct current and including a pair of output terminals and an electric valve of the type having a filamentary cathode, means for variably energizing said cathode in accordance with an electrical condition of one of said circuits to produce a variable unidirectional voltage between said output terminals dependent upon said condition, an electric valve including an anode, a cathode, and a control member, a source of alternating-current voltage and a transformer connected in series with the anode-cathode circuit of said electric valve, means for impressing on the control member of said electric valve an alternating current voltage displaced in phase with respect to said source of alternating-current voltage, and a unidirectional voltage dependent upon the voltage between said output terminals, and means for energizing the control electrode of said electric valve means from said transformer to control the instants of initiation of conduction of said valve means in accordance with said condition.

28. In combination, a supply circuit, a load circuit, electric translating apparatus interconnecting said circuits including electric valve means having a control electrode, means for effecting intermittent conduction of said electric valve means thereby to effect intermittent energization of said load circuit, a source of direct-current voltage, a bridge circuit connected for energization from said source of direct current voltage and including a pair of output terminals and an electric valve of the type having a filamentary cathode, means for variably energizing said cathode in accordance with an electrical condition of said load circuit to produce a variable unidirectional voltage between said output terminals dependent upon said condition, auxiliary means for producing a unidirectional voltage between said output terminals corresponding to a predetermined value of said condition, and means for energizing the control electrode of said electric valve means in accordance with the voltage between said output terminals to control the instant of initiation of conduction of said electric valve means in accordance with said condition during periods of energization of said load circuit and for establishing an energization of the control electrode corresponding to a predetermined value of said condition prior to energization of said load circuit.

29. In combination, a supply circuit, a load circuit, electric translating apparatus interconnecting said circuits including electric valve means having a control electrode, timing means for effecting intermittent conduction of said electric valve means thereby to effect intermittent energization of said load circuit, an electric valve including an anode, a cathode, and a control member, a source of alternating-current voltage and a transformer connected in series with the anode cathode circuit of said electric valve, means for impressing on the control member of said electric valve an alternating-current voltage displaced in phase with respect to said source of alternating-current voltage and a unidirectional voltage, means for varying the magnitude of said unidirectional voltage in response to an electrical condition of said load circuit during periods of energization of said load circuit and for maintaining said unidirectional voltage at a value corresponding to a predetermined energization of said load circuit during periods of deenergization of said load circuit, and means for energizing said control electrode from said transformer.

30. In combination, a supply circuit, a load circuit, electric translating apparatus interconnecting said circuits including electric valve means having a control electrode, means for effecting intermittent conduction of said electric valve means thereby to effect intermittent energization of said load circuit, an electric valve including an anode, a cathode, and a control member, a source of voltage and a transformer connected in series with the anode-cathode circuit of said electric valve, means for impressing on the control member of said electric valve an alternating-current component of voltage and a unidirectional component of voltage, means for varying the magnitude of said unidirectional component of voltage in response to an electrical condition of said load circuit during periods of energization of said load circuit and for maintaining said unidirectional voltage at a value corresponding to a predetermined energization of said load circuit during periods of deenergization of said load circuit, and means for energizing said control electrode from said transformer to energize said control electrode with peaked voltages variable in phase in accordance with the magnitude of said unidirectional component of voltage.

BENJAMIN COOPER.

REFERENCES CITED

The following references are of record in the file of this patent:

UNITED STATES PATENTS

| Number | Name | Date |
| --- | --- | --- |
| 2,066,943 | Philpott | Jan. 5, 1937 |
| 2,083,297 | Gulliksen et al. | June 8, 1937 |
| 2,067,500 | Morton | Jan. 12, 1937 |
| 1,973,082 | Koros | Sept. 11, 1934 |
| 2,175,694 | Jones, Jr. | Oct. 10, 1939 |
| 2,210,394 | Braden | Aug. 6, 1940 |
| 2,236,195 | McKesson | Mar. 25, 1941 |
| 2,262,044 | Philpott | Nov. 11, 1941 |
| 1,946,287 | Kearsely | Feb. 6, 1934 |

OTHER REFERENCES

American Standard Definitions of Electrical Terms, published by American Institute of Electrical Engineers, Approved August 12, 1941, page 232. (Copy in Division 51.)